United States Patent
Hu et al.

(10) Patent No.: US 12,252,851 B1
(45) Date of Patent: Mar. 18, 2025

(54) METHOD OF CALCULATING THE DOSAGE OF PHASE CHANGE COARSE AGGREGATE, METHOD OF MANUFACTURING THE SAME AND THERMOREGULATING PAVEMENT

(71) Applicant: CCCC FIRST HIGHWAY CONSULTANTS CO., LTD., Shaanxi (CN)

(72) Inventors: Binhua Hu, Shaanxi (CN); Long Jin, Shaanxi (CN); Yuanhong Dong, Shaanxi (CN); Zijun Li, Shaanxi (CN); Jianbing Chen, Shaanxi (CN); Yan Mu, Shaanxi (CN); Hui Peng, Shaanxi (CN); Yao Wei, Shaanxi (CN); Wansheng Pei, Shaanxi (CN); Tian Sun, Shaanxi (CN)

(73) Assignee: CCCC FIRST HIGHWAY CONSULTANTS CO., LTD., Shaanxi Province (CN)

(*) Notice: Subject to any disclaimer, the term of this patent is extended or adjusted under 35 U.S.C. 154(b) by 0 days.

(21) Appl. No.: 18/954,491

(22) Filed: Nov. 20, 2024

(30) Foreign Application Priority Data

Mar. 29, 2024 (CN) .......................... 202410376185.X

(51) Int. Cl.
  *E01C 7/14* (2006.01)
  *B28C 7/02* (2006.01)
  *E01C 7/32* (2006.01)

(52) U.S. Cl.
  CPC ................ *E01C 7/142* (2013.01); *B28C 7/02* (2013.01); *E01C 7/32* (2013.01)

(58) Field of Classification Search
  CPC .............. B28C 7/02; E01C 7/142; E01C 7/32
  (Continued)

(56) References Cited

U.S. PATENT DOCUMENTS 3,791,443 A * 2/1974 Burt ..................... E02D 27/35
  165/45
3,877,893 A * 4/1975 Sweny ..................... C10K 1/16
  95/207
(Continued)

FOREIGN PATENT DOCUMENTS

CN 102911583 A 2/2013
CN 205874873 U 1/2017
(Continued)

OTHER PUBLICATIONS

Dong, Zizhen et al., "Effect of Gradation on the Performance of Phase Change Asphalt Mixture", Science Technology and Engineering, vol. 24, No. 1, Jan. 8, 2024, p. 352-359.
(Continued)

*Primary Examiner* — Raymond W Addie
(74) *Attorney, Agent, or Firm* — CKC & Partners Co., LLC

(57) ABSTRACT

The present invention provides a method of calculating the dosage of phase change coarse aggregate, which comprises the steps of setting a regulatory temperature difference of a thermoregulating cement-stabilized layer, the regulatory temperature difference being the difference between the peak temperature of the thermoregulating cement-stabilized layer and the peak temperature of a conventional cement-stabilized layer, wherein the thermoregulating cement-stabilized layer is mixed with a phase change coarse aggregate, while the conventional cement-stabilized layer is not mixed with a phase change coarse aggregate; calculating a regulatory heat based on the regulatory temperature difference, wherein when a temperature change of the conventional cement-stabilized layer is the regulatory temperature difference, a heat change of the conventional cement-stabilized layer is the regulatory heat; and calculating a volume
(Continued)

occupied by the phase change coarse aggregate in the thermoregulating cement-stabilized layer based on the regulatory heat.

8 Claims, 1 Drawing Sheet

(58) Field of Classification Search
USPC .......................................................... 404/17
See application file for complete search history.

(56) References Cited

U.S. PATENT DOCUMENTS

| | | | | |
|---|---|---|---|---|
| 8,303,211 | B2* | 11/2012 | Wang | E01C 11/245 404/27 |
| 11,661,711 | B1* | 5/2023 | Ayadat | B32B 5/022 404/31 |
| 2019/0263721 | A1* | 8/2019 | Lopez Casanova | C04B 14/202 |

FOREIGN PATENT DOCUMENTS

| | | |
|---|---|---|
| CN | 108629101 A | 10/2018 |
| CN | 111118999 A | 5/2020 |
| CN | 111499245 A | 8/2020 |
| CN | 111925156 A | 11/2020 |
| CN | 113185237 A | 7/2021 |
| CN | 115075281 A | 9/2022 |
| CN | 116375406 A | 7/2023 |
| KR | 20220118760 A | 8/2022 |
| KR | 20230070670 A | 5/2023 |
| WO | WO-2016163346 A1 * 10/2016 ........... C09D 201/00 |

OTHER PUBLICATIONS

Peng, Hui et al., "Study on Calculation Method and Adaptability of Subgrade Stability in Permafrost Region", Subgrade Engineering, No. 6, 2019, Dec. 20, 2019, p. 41-46.

Ottavia Rispoli et al., "Comparative life cycle assessment of a novel sustainable road pavement system adopting recycled plastic from PET bottles and carbonated aggregate", Heliyon, Jan. 30, 2024.

Zhou, Xueyan et al., "Pavement Performance of Composite Shape-stabilized Phase Change Material Used for Asphalt Pavement", Bulletin of The Chinese Ceramic Society, vol. 36, No. 8, Aug. 15, 2017, p. 2743-2748, 2786.

Lin, Feipeng et al., "Review on Application and Research in Temperature-Adjusting Asphalt Pavements Based on Phase Change Materials", Materials China, vol. 36, No. 6, Jun. 11, 2017, p. 467-472.

Tan, Yiqiu et al., "Preparation of Latent Heat Materials Used in Asphalt Pavement and Its Performance of Temperature Control", Journal of Building Materials, vol. 16, No. 2, Apr. 15, 2013, p. 354-359.

Wang, Fei et al., "Experimental Study on the Deformation of the Stable Layer of Road Water under the Sequential Coupling Effect of Drying-wetting and Freezing-thawing and Vehicle Load", Science Technology and Engineering, vol. 18, No. 29, Oct. 18, 2018, p. 232-238.

* cited by examiner

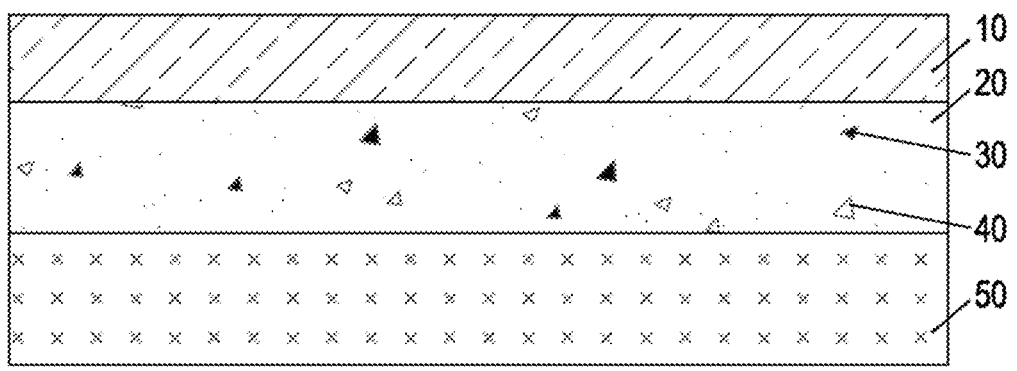

METHOD OF CALCULATING THE DOSAGE OF PHASE CHANGE COARSE AGGREGATE, METHOD OF MANUFACTURING THE SAME AND THERMOREGULATING PAVEMENT

CROSS-REFERENCE TO RELATED APPLICATIONS

This non-provisional application claims priority under 35 U.S.C. § 119 (a) to patent application No. 202410376185.X filed in P.R. China on Mar. 29, 2024, the entire contents of which are hereby incorporated by reference.

Some references, if any, which may include patents, patent applications and various publications, may be cited and discussed in the description of this application. The citation and/or discussion of such references, if any, is provided merely to clarify the description of this application and is not an admission that any such reference is "prior art" to the application described herein. All references listed, cited and/or discussed in this specification are incorporated herein by reference in their entirety and to the same extent as if each reference was individually incorporated by reference.

FIELD OF THE INVENTION

The present invention relates to the technical field of pavement engineering construction, in particular to a method of calculating the dosage of phase change coarse aggregate, a method of manufacturing the same and a thermoregulating pavement.

BACKGROUND OF THE INVENTION

Permafrost is thermally sensitive, and the construction of engineering structures in permafrost areas risks frost heave and thaw settlement. Highway asphalt pavement has the significant thermal characteristics of "wide, thick and black", while the heat absorption of asphalt pavement and the heat accumulation effect of large-scale permafrost subgrade cause the upper limit of permafrost to be continuously lowered and the permafrost foundation to be degraded, resulting in subgrade damage such as thermal thawing and settlement. Therefore, in order to protect the permafrost, reduce the occurrence and development of subgrade damage, and improve the working condition of the subgrade, it is necessary to reduce the strong heat absorption effect of the pavement.

Phase change energy storage is a kind of high-tech technology that can store energy in the form of phase change latent heat with high density. If this technology is applied to the strong endothermic asphalt pavement of permafrost subgrade engineering, when the ambient temperature rises, the endothermic boundary absorbs heat and reaches the phase transition temperature of the material, i.e., when the phase transition occurs, it stores a large amount of heat, but its temperature will be essentially unchanged to prevent the heat from being transferred downward. Consequently, in permafrost subgrade engineering, this technology can effectively alleviate the warming rate of the highly endothermic surface of asphalt pavement and reduce the relative heat absorption when applied to pavement structures.

Phase change energy storage technology has been applied to real-world scenarios in road engineering, such as adding phase change materials to the pavement surface layer to form a thermoregulating pavement to alleviate the urban heat island effect, laying phase change heat-collecting pavement on ice and snow road sections to collect heat energy during the daytime and actively melt the snow, adding phase change materials to mass concrete to regulate hydration heat and reduce the temperature cracking, and so on. However, the application of the above technologies is also associated with some problems. For example, direct mixing has a significant impact on the strength and other properties of asphalt and concrete, and the use of porous mediums such as silica, diatomite and pottery sand as carriers has a risk of abrasion and leakage under the repeated impact of traffic loads, as well as rapid attenuation of the phase change energy storage capacity due to high-temperature mixing and other construction processes. At present, most applications of phase change materials in pavement engineering are in the surface layer and are usually encapsulated in porous medium carriers, resulting in risks such as susceptibility to abrasion and damage.

In view of the above, how to reduce the risk of abrasion and damage of phase change materials without affecting the strength index of pavements, so as to ensure the phase change energy storage performance of phase change materials, is a problem that currently needs to be solved.

SUMMARY OF THE INVENTION

Given the problem in the prior art that the energy storage performance of phase change materials in a pavement structure is not easily ensured, the present invention provides a method of calculating the dosage of phase change coarse aggregate, a method of manufacturing the same and a thermoregulating pavement.

In order to achieve the purpose, the technical solutions adopted by the present invention are as follows.

One aspect of the invention is a method of calculating the dosage of phase change coarse aggregate, which comprises the steps of setting a regulatory temperature difference of a thermoregulating cement-stabilized layer, the regulatory temperature difference being the difference between the peak temperature of the thermoregulating cement-stabilized layer and the peak temperature of a conventional cement-stabilized layer, wherein the thermoregulating cement-stabilized layer is mixed with a phase change coarse aggregate, while the conventional cement-stabilized layer is not mixed with a phase change coarse aggregate;

calculating a regulatory heat based on the regulatory temperature difference, wherein when a temperature change of the conventional cement-stabilized layer is the regulatory temperature difference, a heat change of the conventional cement-stabilized layer is the regulatory heat; and calculating a volume occupied by the phase change coarse aggregate in the thermoregulating cement-stabilized layer based on the regulatory heat.

In one preferred embodiment of the invention, before setting the regulatory temperature difference of the thermoregulating cement-stabilized layer, the method further comprises the step of calculating the peak temperature of the thermoregulating cement-stabilized layer based on the peak temperature of the conventional cement-stabilized layer.

In one preferred embodiment of the invention, the peak temperature of the thermoregulating cement-stabilized layer is calculated by using Equation $$T_2 = \sqrt{\frac{t_2 - t_1}{t'_2 - t'_1}} \cdot T_1;$$

where $T_2$ is the peak temperature of the thermoregulating cement-stabilized layer, $T_1$ is the peak temperature of the conventional cement-stabilized layer, $t_1$ is the exothermic onset time of the conventional cement-stabilized layer, $t_2$ is the exothermic termination time of the conventional cement-stabilized layer, $t_1'$ is the exothermic onset time of the thermoregulating cement-stabilized layer, and $t_2'$ is the exothermic termination time of the thermoregulating cement-stabilized layer.

In one preferred embodiment of the invention, after calculating the volume occupied by the phase change coarse aggregate in the thermoregulating cement-stabilized layer, the method further comprises the step of calculating a mixing ratio of the phase change coarse aggregate in the thermoregulating cement-stabilized layer based on the volume occupied by the phase change coarse aggregate in the thermoregulating cement-stabilized layer.

In one preferred embodiment of the invention, the mixing ratio n of the phase change coarse aggregate in the thermoregulating cement-stabilized layer is calculated by using Equation $$n = \frac{V_3}{V_0' + V_2 + V_3} \times 100\%;$$

where $V_2$ is the volume occupied by the conventional coarse aggregate in the thermoregulating cement-stabilized layer and $V_2 \geq 0$, $V_0'$ is the volume occupied by substances other than the conventional coarse aggregate and the phase change coarse aggregate in the thermoregulating cement-stabilized layer, and $V_3$ is the volume occupied by the phase change coarse aggregate in the thermoregulating cement-stabilized layer.

In one preferred embodiment of the invention, the regulatory heat is calculated by using Equation $\Delta Q = c_0 \rho_0 V_0 \Delta T + c_1 \rho_1 V_1 \Delta T$; where $\Delta T = T_2 - T_1$, $\Delta T$ is the regulatory temperature difference, $T_2$ is the peak temperature of the thermoregulating cement-stabilized layer, $T_1$ is the peak temperature of the conventional cement-stabilized layer, $\Delta Q$ is the regulatory heat, $c_0$ is the specific heat capacity of substances other than the conventional coarse aggregate in the conventional cement-stabilized layer, $\rho_0$ is the density of substances other than the conventional coarse aggregate in the conventional cement-stabilized layer, $V_0$ is the volume of substances other than the conventional coarse aggregate in the conventional cement-stabilized layer, c is the specific heat capacity of the conventional coarse aggregate in the conventional cement-stabilized layer, $\rho_1$ is the density of the conventional coarse aggregate in the conventional cement-stabilized layer, and $V_1$ is the volume of the conventional coarse aggregate in the conventional cement-stabilized layer.

In one preferred embodiment of the invention, the conventional cement-stabilized layer and the thermoregulating cement-stabilized layer satisfy Equations $V_0' = V_0$ and $V_1 = V_2 + V_3$.

In one preferred embodiment of the invention, the volume occupied by the phase change coarse aggregate in the thermoregulating cement-stabilized layer is calculated by using Equation $$V_3 = \frac{\Delta Q}{\Delta H \cdot \rho_3};$$

where $V_3$ is the volume occupied by the phase change coarse aggregate in the thermoregulating cement-stabilized layer, $\Delta H$ is the latent heat of phase change of the phase change coarse aggregate, and $\rho_3$ is the density of the phase change coarse aggregate.

Another aspect of the invention is a method of manufacturing a phase change coarse aggregate for use in the above-described dosage calculation method, and the manufacturing method comprises the steps of fabricating a metal shell;

drilling a hole in the metal shell;

injecting a phase change material into the metal shell through the hole; and sealing the hole of the metal shell.

Yet another aspect of the invention is a thermoregulating pavement which employs the above-described method, wherein the thermoregulating pavement comprises a surface layer, a thermoregulating cement-stabilized layer, and a subbase layer disposed in sequence.

In one preferred embodiment of the invention, the phase change coarse aggregate comprises a metal shell and a phase change material provided in the metal shell.

In one preferred embodiment of the invention, the phase change material satisfies a supercooling degree of less than or equal to 5.0° C., a phase transition temperature of greater than or equal to 10.0° C., and a latent heat of greater than or equal to 120.0 J/g.

In one preferred embodiment of the invention, the phase change coarse aggregate has an irregular shape to allow the phase change coarse aggregate to interlock with other materials in the thermoregulating cement-stabilized layer.

BRIEF DESCRIPTION OF THE DRAWINGS

The following drawings are provided for illustrative purposes only and merely depict exemplary embodiments of the disclosure. These drawings are provided to facilitate the reader's understanding of the disclosure and should not be considered as limiting to the breadth, scope, or applicability of the disclosure. It should be noted that these drawings are not necessarily drawn to scale for clarity and ease of illustration.

The figure is a structural diagram of a thermoregulating pavement according to the present invention.

DETAILED DESCRIPTION OF THE EXEMPLARY EMBODIMENT

The invention will be described in more detail below with reference to specific embodiments. However, the embodiments described below are merely illustrative and should not be construed as limiting the scope of the foregoing subject matter of the invention, and all technologies implemented according to the contents of the invention fall within the scope of the invention.

Unless otherwise indicated, in the descriptions of specific embodiments of the invention, terms such as "upper", "lower", "left", "right", "center", "inner", "outer", etc., which indicate orientation or positional relationship, are all expressions based on the orientation or positional relationship shown in the accompanying drawings or the orientation or positional relationship with which the product/equipment/device of the invention is commonly used. These terms of orientation or positional relationship are used only for the purpose of facilitating the description of the technical solutions of the invention or simplifying the description of the specific embodiments to facilitate a quick understanding of the technical solutions of the invention by those skilled in the art. Accordingly, they do not indicate or imply that a particular device/component/element must have a particular orientation or be constructed and operated in a particular positional relationship and should therefore not be construed as a limitation of the invention.

Furthermore, whenever the terms "horizontal", "vertical", "overhanging", "parallel", etc. are used, they do not imply that the corresponding device/component/element must be absolutely horizontal, vertical, overhanging or parallel, but may be slightly inclined or deviated. For example, "horizontal" merely implies that its orientation is more horizontal than "vertical" and does not mean that the structure must be completely horizontal, but may be slightly inclined. Alternatively, it can simply be understood that when the corresponding device/component/element is set in a direction such as "horizontal", "vertical", "overhanging", "parallel", etc., it can be set with an error/deviation of +10%, preferably within +8%, more preferably within +6%, even more preferably within +5%, and most preferably within +4% with respect to the corresponding directional setting. As long as the corresponding device/component/element is still able to perform its function in the solutions of the invention within these error/deviation ranges.

Furthermore, whenever expressions such as "first", "second", "third," etc. are used in the terms, they are merely descriptions used to distinguish the same or similar components and should not be construed as emphasizing or implying the relative importance of any particular element.

Furthermore, in the descriptions of embodiments of the invention, "several", "a plurality of" or "many" means at least 2. This can be any of 2, 3, 4, 5, 6, 7, 8, 9, or even more than 9.

Furthermore, in the description of technical solutions of the invention, unless otherwise expressly indicated/defined/restricted, wherever the terms "provide", "install", "interconnect", "connect", "mix", "lay" and "arrange" are used, they should be interpreted in a broad sense, e.g., they may be a fixed connection, a removable connection, or an integral connection. It may also include welding, riveting, bolting, threading, and other means of connection commonly used in the field. This connection may be a mechanical connection, an electrical connection, or a telecommunications connection. It may also be a direct connection, an indirect connection through an intermediate medium, or an internal connection of two elements.

In the related art, phase change material has been added to the pavement, and the phase transition of the phase change material has been used to store a large amount of heat, thereby preventing heat transfer downwards and reducing the warming rate of the pavement. However, the phase change material is usually provided in the surface layer of the pavement, which is susceptible to abrasion and damage during long-term use, resulting in a reduction in the energy storage performance of the phase change material. In addition, the dosage accuracy cannot be guaranteed because the dosage of the phase change material is usually controlled by experience. Therefore, the technical solutions of the present application have been developed to solve such problems, which are described below with reference to the figure.

One aspect of the invention provides a method of calculating the dosage of phase change coarse aggregate 30 in a thermoregulating cement-stabilized layer, wherein a thermoregulating pavement typically comprises a surface layer 10, a thermoregulating cement-stabilized layer 20, and a sub-base layer 50 provided in sequence, and the calculation method may comprise the following steps.

Firstly, a regulatory temperature difference 4T of the thermoregulating cement-stabilized layer 20 in the thermoregulating pavement is set, wherein the regulatory temperature difference $\Delta T$ is the difference between the peak temperature $T_2$ of the thermoregulating cement-stabilized layer 20 and the peak temperature Ty of the conventional cement-stabilized layer, in which the thermoregulating cement-stabilized layer 20 is mixed with a phase change coarse aggregate 30 and the conventional cement-stabilized layer is not mixed with a phase change coarse aggregate 30. That is, the thermoregulating cement-stabilized layer 20 can be formed by mixing a phase change coarse aggregate 30 into the conventional cement-stabilized layer, wherein the phase change coarse aggregate 30 contains a phase change material. As a result, the phase transition of the phase change material stores a large amount of heat, thereby allowing the peak temperature of the cement-stabilized layer to be reduced from $T_1$ to $T_2$.

Then, a regulatory heat $\Delta Q$ is calculated based on the regulatory temperature difference, wherein when the temperature of the conventional cement-stabilized layer is elevated by the regulatory temperature difference $\Delta T$, then the heat absorbed by the conventional cement-stabilized layer is the regulatory heat $\Delta Q$, i.e., the heat that can be absorbed by the phase change coarse aggregate 30 in the thermoregulating cement-stabilized layer 20 when the temperature of the thermoregulating cement-stabilized layer 20 is elevated by the regulatory temperature difference $\Delta T$.

Finally, a volume $V_3$ occupied by the phase change coarse aggregate 30 in the thermoregulating cement-stabilized layer 20 is calculated based on the regulatory heat $\Delta Q$.

In the present invention, the phase change coarse aggregate 30 is mixed for the purpose of reducing the peak temperature of the cement-stabilized layer, such as reducing the peak temperature of the cement-stabilized layer from $T_1$ to $T_2$, where $T_1$ can be construed as the peak temperature of the conventional cement-stabilized layer and $T_2$ can be construed as the peak temperature of thermoregulating cement-stabilized layer 20. Based on this, first the regulatory temperature difference $\Delta T=T_2-T_1$ is calculated, then the regulatory heat $\Delta Q$ is calculated, and finally, the volume $V_3$ occupied by the phase change coarse aggregate 30 in the regulated temperature stabilizing layer 20 is calculated.

As a result, since the phase change coarse aggregate 30 is mixed into the thermoregulating cement-stabilized layer 20 instead of the surface layer 10, the phase change coarse aggregate 30 can be protected from abrasion and damage, which in turn ensures the energy storage capability of the phase change coarse aggregate 30. On the other hand, if the phase change coarse aggregate 30 is mixed in too small of an amount, the expected regulatory temperature difference will not be achieved, and the peak temperature of the cement-stabilized layer will not be reduced to the expected value, thus failing to provide sufficient protection to the pavement. Especially for the permafrost subgrade, the pavement will experience subgrade damage such as thermal thawing and settlement if the cement-stabilized layer fails to achieve the expected regulatory temperature difference. In contrast, if the phase change coarse aggregate 30 is mixed in an excessive amount, the investment cost of the pavement will be increased and will result in wasted phase change material. Therefore, the dosage of phase change coarse aggregate 30 can be accurately controlled while effectively reducing the peak temperature by the above calculation. Especially for the permafrost subgrade, the material cost of phase change coarse aggregate 30 can be reduced while effectively reducing the peak temperature. Furthermore, in the process of pavement construction, the expected protection effect can be achieved while reducing the investment cost of the pavement, which is economically beneficial. Furthermore, the application scenario of the thermoregulating pavement according to the present invention is usually in permafrost areas, where the metal shell of the phase change coarse aggregate has good thermal conductivity, which enables the phase change coarse aggregate 30 to perform the function of phase change energy storage quickly and fully, thus preventing the heat from being transferred downward and protecting the permafrost.

In a preferred embodiment of the invention, before setting the regulatory temperature difference of thermoregulating cement-stabilized layer 20, the method further comprises a step of calculating the peak temperature $T_2$ of thermoregulating cement-stabilized layer 20 based on the peak temperature Ty of the conventional cement-stabilized layer, wherein the peak temperature Ty of the conventional cement-stabilized layer can be obtained from an actual measurement.

In a preferred embodiment of the invention, the peak temperature of thermoregulating cement-stabilized layer 20 is calculated by using Equation $$T_2 = \sqrt{\frac{t_2 - t_1}{t_2' - t_1'}} \cdot T_1;$$

where $T_2$ is the peak temperature of thermoregulating cement-stabilized layer 20, T, is the peak temperature of the conventional cement-stabilized layer, $t_1$ is the exothermic onset time of the conventional cement-stabilized layer, $t_2$ is the exothermic termination time of the conventional cement-stabilized layer, $t_1'$ is the exothermic onset time of thermoregulating cement-stabilized layer 20, and $t_2'$ is the exothermic termination time of thermoregulating cement-stabilized layer 20. The exothermic onset time can be construed as the timing at which the phase change material starts performing its function when the external temperature is higher than the phase transition temperature of the phase change material. The exothermic termination time can be construed as the timing at which the phase change material stops performing its function when the external temperature is lower than the phase transition temperature of the phase change material. In the specific calculation process, $T_1$, $t_1$, $t_2$, $t_1'$ and $t_2'$ are determined by a specific measurement. Among them, tr'=$t_1$ can be set in order to facilitate the calculation.

In a preferred embodiment of the invention, after calculating the volume $V_3$ occupied by the phase change coarse aggregate 30 in the thermoregulating cement-stabilized layer 20, the method further comprises a step of calculating the mixing ratio n of the phase change coarse aggregate 30 in the thermoregulating cement-stabilized layer 20 based on the volume $V_3$ occupied by the phase change coarse aggregate 30 in the thermoregulating cement-stabilized layer 20.

In a preferred embodiment of the invention, the mixing ratio n of the phase change coarse aggregate 30 in the thermoregulating cement-stabilized layer 20 is calculated by using Equation $$n = \frac{V_3}{V_0' + V_2 + V_3},$$

where n is the mixing ratio of phase change coarse aggregate 30 in the thermoregulating cement-stabilized layer 20, $V_2$ is the volume occupied by the conventional coarse aggregate 40 in the thermoregulating cement-stabilized layer 20 and $V_2 \geq 0$, wherein $V_2=0$ means that only phase change coarse aggregate 30 is provided in the thermoregulating cement-stabilized layer 20, $V_2>0$ means that both the phase change coarse aggregate 30 and the conventional coarse aggregate 40 are provided in the thermoregulating cement-stabilized layer 20, $V_0$ is the volume occupied by substances other than the conventional coarse aggregate 40 and the phase change coarse aggregate 30 in the thermoregulating cement-stabilized layer 20, and $V_3$ is the volume occupied by the phase change coarse aggregate 30 in the thermoregulating cement-stabilized layer 20.

Furthermore, the mixing ratio n is usually a percentage, so the above equation is also denoted as $$n = \frac{V_3}{V_0' + V_2 + V_3} \times 100\%.$$

In a preferred embodiment of the invention, the regulatory heat is calculated by using Equation $\Delta Q = C_0 \rho_0 V_0 \Delta T + c_1 \beta_1 \Delta T$, where $\Delta T = T_2 - T_1$, $\Delta T$ is the regulatory temperature difference, $T_2$ is the peak temperature of thermoregulating cement-stabilized layer 20, $T_1$ is the peak temperature of the conventional cement-stabilized layer, $\Delta Q$ is the regulatory heat, $c_0$ is the specific heat capacity of substances other than the conventional coarse aggregate 40 in the conventional cement-stabilized layer, $\rho_0$ is the density of substances other than the conventional coarse aggregate 40 in the conventional cement-stabilized layer, $V_0$ is the volume of substances other than the conventional coarse aggregate 40 in the conventional cement-stabilized layer, c/is the specific heat capacity of the conventional coarse aggregate 40 in the conventional cement-stabilized layer, $\rho_1$ is the density of the conventional coarse aggregate 40 in the conventional cement-stabilized layer, and $V_1$ is the volume of the conventional coarse aggregate 40 in the conventional cement-stabilized layer.

Furthermore, the conventional cement-stabilized layer and the thermoregulating cement-stabilized layer 20 satisfy Equations $V_0'=V_0$ and $V_1=V_2+V_3$. That is, the mixing of the phase change coarse aggregate 30 is conducted by an equal volume replacement method. Specifically, the volume of the conventional coarse aggregate 40 in the conventional cement-stabilized layer is $V_1$, and the thermoregulating cement-stabilized layer 20 is formed by replacing the conventional coarse aggregate 40 in the conventional cement-stabilized layer with an equal volume of the phase change coarse aggregate 30 having a volume of $V_3$, so that the volume of the conventional coarse aggregate in the thermoregulating cement-stabilized layer 20 is reduced to $V_2$, i.e., $V_1=V_2+V_3$, while the volume of the remaining material is unchanged, i.e., $V_0'=V_0$.

In a preferred embodiment of the invention, the volume occupied by the phase change coarse aggregate 30 in the thermoregulating cement-stabilized layer 20 is calculated by using Equation $$V_3 = \frac{\Delta Q}{\Delta H \cdot \rho_3},$$

where $V_3$ is the volume occupied by the phase change coarse aggregate 30 in the thermoregulating cement-stabilized layer 20, ΔH is the latent heat of phase change coarse aggregate 30, and $\rho_3$ is the density of phase change coarse aggregate 30.

Another aspect of the invention provides a method of manufacturing the phase change coarse aggregate 30 for use in the above-described dosage calculation method, and the manufacturing method comprises the steps of fabricating a metal shell, the shell being irregularly shaped to allow the phase change coarse aggregates 30 to be interlocked with each other, thereby ensuring the strength of the pavement structure;

drilling a hole in the metal shell;

injecting a phase change material into the metal shell through the hole in the metal shell; and sealing the hole of the metal shell by welding or the like.

Yet another aspect of the invention provides a thermoregulating pavement which employs the above-described method. The thermoregulating pavement is a composite pavement structure, and more particularly, the thermoregulating pavement includes a surface layer 10, a thermoregulating cement-stabilized layer 20, and a subbase layer 50 provided in sequence. The thermoregulating cement-stabilized layer 20 is provided with a phase change coarse aggregate 30, which can reduce the peak temperature of the thermoregulating pavement, postpone and delay the time at which the thermoregulating cement-stabilized layer 20 reaches the peak temperature, thereby achieving the effect of protecting the pavement. Meanwhile, since the phase change coarse aggregate 30 is provided away from the surface layer 10, abrasion damage to the phase change coarse aggregate 30 is reduced and the energy storage performance of the phase change coarse aggregate 30 is ensured.

In a preferred embodiment of the invention, the phase change coarse aggregate 30 may include a metal shell and a phase change material provided in the metal shell. Wherein the phase change material can be composed of inorganic, organic or composite materials, such as paraffin, polyols, fatty acids or the like, and the phase change material satisfies a supercooling degree of less than or equal to 5.0° C., a phase transition temperature of greater than or equal to 10.0° C., and a latent heat of greater than or equal to 120.0 J/g, so as to effectively utilize the phase change energy storage ability of the phase change material and then fully protect the permafrost when the pavement according to the present invention is applied in permafrost areas. The metal shell can be composed of materials such as steel and has a particle size of 0.075 mm to 53.0 mm. The metal shell can be provided to encapsulate and protect the phase change material therein, and on the other hand, the good thermal conductivity of the metal can be utilized to allow the phase change material to realize its effects.

In a preferred embodiment of the invention, the thermoregulating cement-stabilized layer 20 is mixed with a conventional coarse aggregate 40, the conventional coarse aggregate 40 being composed of natural rock, pebbles or mine waste rock or the like, so as to be used as a framework for the concrete in the pavement and to improve the structural stability of the concrete in the pavement.

In a preferred embodiment of the invention, the phase change coarse aggregate 30 has an irregular shape and a rough surface, and as compared to a regular shape such as a circle or a rectangle, the irregular and rough shape design of the phase change coarse aggregate 30 allows the phase change coarse aggregate 30 to interlock with other materials in the thermoregulating cement-stabilized layer 20, so as to generate a larger internal frictional resistance to ensure that the structure of the thermoregulating cement-stabilized layer 20 is fixed and to ensure that the thermoregulating pavement is structurally strong.

All the above are only some of the preferred embodiments of the invention and are not intended to limit the invention. The invention may also have a variety of other embodiments, and without departing from the spirit and substance of the invention, a person skilled in the art may make various changes and modifications in accordance with the invention, but such changes and modifications shall fall within the protection scope of the invention.

What is claimed is:

1. A method of calculating a dosage of phase change coarse aggregate, which comprises the steps of setting a regulatory temperature difference of a thermoregulating cement-stabilized layer, the regulatory temperature difference being the difference between the peak temperature of the thermoregulating cement-stabilized layer and the peak temperature of a conventional cement-stabilized layer, wherein the thermoregulating cement-stabilized layer is mixed with a phase change coarse aggregate, while the conventional cement-stabilized layer is not mixed with a phase change coarse aggregate;

calculating a regulatory heat based on the regulatory temperature difference, wherein when a temperature change of the conventional cement-stabilized layer is the regulatory temperature difference, a heat change of the conventional cement-stabilized layer is the regulatory heat; and calculating a volume occupied by the phase change coarse aggregate in the thermoregulating cement-stabilized layer based on the regulatory heat;

after calculating a volume occupied by the phase change coarse aggregate in the thermoregulating cement-stabilized layer, the method further comprises the step of calculating a mixing ratio of the phase change coarse aggregate in the thermoregulating cement-stabilized layer based on the volume occupied by the phase change coarse aggregate in the thermoregulating cement-stabilized layer;

calculating the mixing ratio n of the phase change coarse aggregate in the thermoregulating cement-stabilized layer by using Equation $$n = \frac{V_3}{V_0' + V_2 + V_3},$$

where $V_2$ is the volume occupied by the conventional coarse aggregate in the thermoregulating cement-stabilized layer and $V_2 \geq 0$, $V_0'$ is the volume occupied by substances other than the conventional coarse aggregate and the phase change coarse aggregate in the thermoregulating cement-stabilized layer, and $V_3$ is the volume occupied by the phase change coarse aggregate in the thermoregulating cement-stabilized layer;

calculating the regulatory heat by using Equation $\Delta Q = c_0 \rho_0 V_0 \Delta T + c_1 \rho_1 V_1 \Delta T$ where $\Delta T = T_2 - T_1$, $\Delta T$ is the regulatory temperature difference, $T_2$ is the peak temperature of the thermoregulating cement-stabilized layer, $T_1$ is the peak temperature of the conventional cement-stabilized layer, $\Delta Q$ is the regulatory heat, $c_0$ is the specific heat capacity of substances other than the conventional coarse aggregate in the conventional cement-stabilized layer, $\rho_0$ is the density of substances other than the conventional coarse aggregate in the conventional cement-stabilized layer, $V_0$ is the volume of substances other than the conventional coarse aggregate in the conventional cement-stabilized layer, c is the specific heat capacity of the conventional coarse aggregate in the conventional cement-stabilized layer, $\rho_1$ is the density of the conventional coarse aggregate in the conventional cement-stabilized layer, and $V_1$ is the volume of the conventional coarse aggregate in the conventional cement-stabilized layer;

calculating the volume occupied by the phase change coarse aggregate in the thermoregulating cement-stabilized layer by using Equation $$V_3 = \frac{\Delta Q}{\Delta H \cdot \rho_3},$$

where $V_3$ is the volume occupied by the phase change coarse aggregate in the thermoregulating cement-stabilized layer, $\Delta H$ is the latent heat of phase change of the phase change coarse aggregate, and $\rho_3$ is the density of the phase change coarse aggregate.

2. The method of calculating the dosage of phase change coarse aggregate according to claim 1, wherein before setting the regulatory temperature difference of the thermoregulating cement-stabilized layer, the method further comprises the step of calculating the peak temperature of the thermoregulating cement-stabilized layer based on the peak temperature of the conventional cement-stabilized layer.

3. The method of calculating the dosage of phase change coarse aggregate according to claim 2, wherein the peak temperature of the thermoregulating cement-stabilized layer is calculated by using Equation $$T_2 = \sqrt{\frac{t_2 - t_1}{t_2' - t_1'}} \cdot T_1,$$

where $T_2$ is the peak temperature of the thermoregulating cement-stabilized layer, $T_1$ is the peak temperature of the conventional cement-stabilized layer, $t_1$ is an exothermic onset time of the conventional cement-stabilized layer, $t_2$ is an exothermic termination time of the conventional cement-stabilized layer, $t_1'$ is an exothermic onset time of the thermoregulating cement-stabilized layer, and $t_2'$ is an exothermic termination time of the thermoregulating cement-stabilized layer.

4. A method of manufacturing a phase change coarse aggregate, wherein the dosage of phase change coarse aggregate is calculated using the method of calculating the dosage of phase change coarse aggregate according to claim 1, and the manufacturing method comprises the steps of
fabricating a metal shell;
drilling a hole in the metal shell;
injecting a phase change material into the metal shell through the hole in the metal shell; and
sealing the hole of the metal shell.

5. A thermoregulating pavement, wherein the dosage of phase change coarse aggregate in the thermoregulating pavement is calculated using the method of calculating the dosage of phase change coarse aggregate according to claim 1, and the thermoregulating pavement comprises a surface layer, a thermoregulating cement-stabilized layer, and a subbase layer provided in sequence.

6. The thermoregulating pavement according to claim 5, wherein the phase change coarse aggregate comprises a metal shell and a phase change material provided in the metal shell.

7. The thermoregulating pavement according to claim 6, wherein the phase change material satisfies a supercooling degree of less than or equal to 5.0° C., a phase transition temperature of greater than or equal to 10.0° C., and a latent heat of greater than or equal to 120.0 J/g.

8. The thermoregulating pavement according to claim 5, wherein the phase change coarse aggregate has an irregular shape to allow the phase change coarse aggregate to interlock with other materials in the thermoregulating cement-stabilized layer.

* * * * *